(No Model.)
E. LONG.
CLUTCH.
No. 328,126. Patented Oct. 13, 1885.
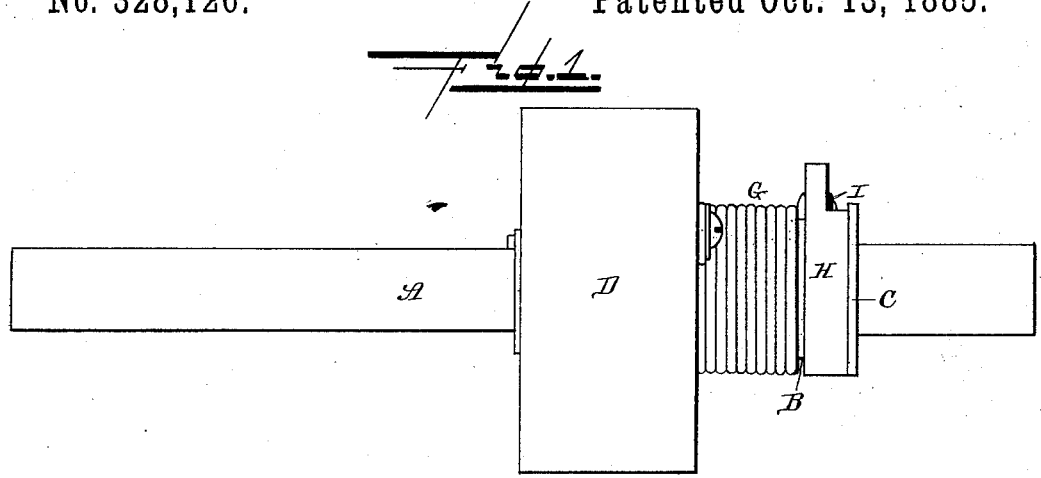
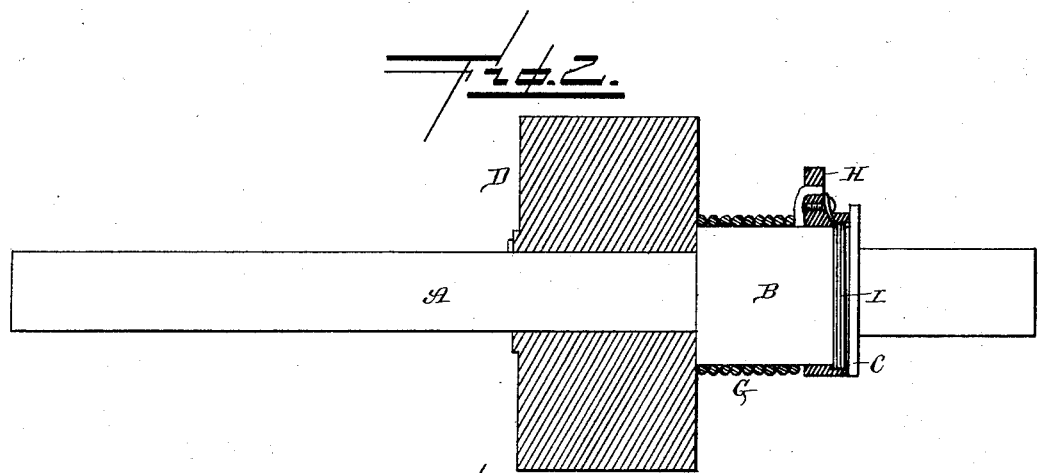
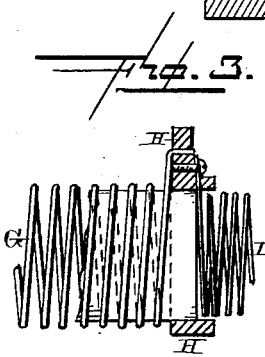
Witnesses:
J. W. Garner
N. S. D. Haines
Inventor:
E. Long
per
J. A. Lehmann,
att'y.

UNITED STATES PATENT OFFICE.

EDWIN LONG, OF IOWA CITY, IOWA.

CLUTCH.

SPECIFICATION forming part of Letters Patent No. 328,126, dated October 13, 1885.

Application filed August 27, 1883. Renewed June 4, 1885. Serial No. 167,632. (No model.)

*To all whom it may concern:*

Be it known that I, EDWIN LONG, of Iowa City, in the county of Johnson and State of Iowa, have invented certain new and useful Improvements in Clutches; and I do hereby declare the following to be a full, clear, and exact description of the invention, such as will enable others skilled in the art to which it pertains to make and use it, reference being had to the accompanying drawings, which form part of this specification.

My invention relates to an improvement in clutches; and it consists in the combination of a shaft, which is preferably provided with an enlargement and a flange upon the outer end of the enlargement, with a loose pulley which is placed upon the shaft close to the inner end of the enlargement, a spiral spring which has one end attached to the pulley, a band or collar to which the inner end of the spiral spring is attached, and a second smaller spiral spring which encircles the enlargement upon the shaft, which also has one of its ends attached to the collar, all of which will be more fully described hereinafter.

The object of my invention is to provide a clutch which will cause the shaft to revolve with the pulley in one direction, but will allow the pulley to turn freely backward in the other direction without retarding the shaft, thus adapting the clutch to be used in converting a reciprocating movement of different kinds into a continuous rotary one.

Figure 1 is a side elevation of a clutch embodying my invention complete. Fig. 2 is a vertical longitudinal section of the same. Fig. 3 is a detail view showing the two springs attached to the collar which separates them.

A represents a shaft, which has the enlargement B formed upon it at any desired point. At the outer end of this enlargement is formed the flange C, of any desired width, against which the smaller one of the springs bears. Placed loosely upon the shaft against the inner end of the enlargement is the pulley or fly-wheel D, which by means of the clutch is made to revolve continuously with the shaft in one direction, but which allows the pulley to slip idly around when moving backward. Secured to the inner side of this pulley or wheel is one end of the spiral spring G, which incloses the inner end of the enlargement, as shown. The outer end of this spiral spring is secured to the collar or sleeve H, which is placed upon the enlargement and very close to or in contact with the flange C. This collar or sleeve serves to connect the two springs together. The second one, I, of the springs is much smaller than the other, and is wrapped around the enlargement inside of the sleeve or collar.

When the shaft revolves forward, the two springs are made to close tightly upon the enlargement in the same manner as if the two collars were being wound up; but when the pulley turns backward these two springs open outward and allow the shaft to revolve freely without in any way disturbing the shaft. When the pulley moves forward, the springs are wound tightly upon the enlargement, and when the pulley turns backward the springs are partially unwound. The consequence is, the spring grips the shaft in turning forward, and loosens it in turning backward.

A reciprocating movement of any kind connected to the pulley causes the shaft to revolve continuously forward, thus converting one movement into another.

This movement can be used on treadle machinery—such as sewing-machines, scroll-saws, &c.—pendulum movement of any kind, or the direct action of a piston or any other mechanism.

One of the great advantages of a clutch constructed as above described consists in the gradual manner in which springs are wound around the enlargement, thus causing gradual starting of the parts connected to the shaft, and preventing all sudden starts and stoppages, which only have a tendency to injure the machinery connected to the shaft.

Having thus described my invention, I claim—

1. In a clutch, the combination of the shaft, pulley or wheel, and two spiral springs which are connected indirectly together, substantially as set forth.

2. In a clutch, the combination of the shaft, the pulley or wheel, a spiral spring which is connected to the wheel or pulley at one end, a sleeve or collar to which the other end of the spring is attached, and a spiral spring which is attached to the opposite edge of the collar, substantially as specified.

3. In a clutch, the combination of the shaft provided with an enlargement and a flange with the wheel or pulley, a spiral spring connected to the pulley at one end, a sleeve or collar, and a second spiral spring, which is also connected to the sleeve or collar, substantially as shown and described.

In testimony whereof I affix my signature in presence of two witnesses.

EDWIN LONG.

Witnesses:
A. E. SWISHER,
P. RANSOM.